United States Patent
Tan et al.

(10) Patent No.: US 9,695,707 B2
(45) Date of Patent: Jul. 4, 2017

(54) FIVE-DEGREE-OF-FREEDOM ADJUSTMENT AND POSITIONING METHOD AND APPARATUS FOR ASSEMBLY/MEASUREMENT OF ROTOR AND STATOR OF AIRCRAFT ENGINE

(71) Applicant: HARBIN INSTITUTE OF TECHNOLOGY, Heilongjiang (CN)

(72) Inventors: Jiubin Tan, Heilongjiang (CN); Jingzhi Huang, Heilongjiang (CN); Wei Gu, Heilongjiang (CN); Zhongpu Wen, Heilongjiang (CN)

(73) Assignee: HARBIN INSTITUTE OF TECHNOLOGY, Heilongjiang (CN)

( * ) Notice: Subject to any disclaimer, the term of this patent is extended or adjusted under 35 U.S.C. 154(b) by 0 days.

(21) Appl. No.: 15/304,238

(22) PCT Filed: Dec. 26, 2014

(86) PCT No.: PCT/CN2014/195125
§ 371 (c)(1),
(2) Date: Oct. 14, 2016

(87) PCT Pub. No.: WO2016/065717
PCT Pub. Date: May 6, 2016

(65) Prior Publication Data
US 2017/0044928 A1    Feb. 16, 2017

(30) Foreign Application Priority Data
Oct. 29, 2014 (CN) .......................... 2014 1 0591393

(51) Int. Cl.
*G01M 1/00* (2006.01)
*F01D 21/00* (2006.01)
(Continued)

(52) U.S. Cl.
CPC ............ *F01D 21/003* (2013.01); *B25B 27/00* (2013.01); *G01B 21/00* (2013.01);
(Continued)

(58) Field of Classification Search
CPC .................................. G01M 1/00; B25B 1/24
(Continued)

(56) References Cited

U.S. PATENT DOCUMENTS

| 2,712,601 | A | * | 7/1955 | Reinwald | ................. G01B 7/10 |
| | | | | | 307/650 |
| 4,247,090 | A | * | 1/1981 | Hahn | ..................... B25B 5/142 |
| | | | | | 269/295 |

(Continued)

FOREIGN PATENT DOCUMENTS

| CN | 2338859 | 9/1999 |
| CN | 101358546 | 2/2009 |

(Continued)

OTHER PUBLICATIONS

International Search Report for Application No. PCT/CN2014/095125 dated Jul. 20, 2015.

*Primary Examiner* — Jewel V Thompson
(74) *Attorney, Agent, or Firm* — Jenkins, Wilson, Taylor & Hunt, P.A.

(57) ABSTRACT

A five-degree-of-freedom adjustment and positioning method and apparatus for assembly/measurement of rotor and stator of an aircraft engine; said method comprises adjusting a plane motion and a rotation of a tested piece through composite motion comprising five degrees of freedom: a 360° rotatory motion around a Z axis, a plane motion along an X axis and a plane motion along a Y axis, a rotatory motion around the X axis and a rotatory motion around the Y axis; said apparatus comprises: a clamping mechanism, a turning platform component, a translational platform com-
(Continued)

ponent and a rotational platform component. The present invention designs a five-degree-of-freedom adjustment and positioning method and apparatus having properties of large load bearing, high precision and high stiffness, thus improving assembly efficiency and measurement accuracy of the aircraft engine.

4 Claims, 3 Drawing Sheets

(51) Int. Cl.
    *B25B 27/00*     (2006.01)
    *G01B 21/00*     (2006.01)

(52) U.S. Cl.
    CPC .... *F05D 2220/323* (2013.01); *F05D 2240/10* (2013.01); *F05D 2240/24* (2013.01); *F05D 2260/83* (2013.01)

(58) Field of Classification Search
    USPC ........................................ 73/66, 487; 269/41
    See application file for complete search history.

(56) References Cited

U.S. PATENT DOCUMENTS

| | | | |
|---|---|---|---|
| 8,676,045 B1* | 3/2014 | Sawatzky | G03B 15/07 396/3 |
| 8,813,543 B2* | 8/2014 | Douglas | G01M 1/14 73/66 |
| 2008/0154540 A1 | 6/2008 | Katamachi | |
| 2015/0346048 A1* | 12/2015 | Rogalla | G01M 1/14 73/487 |

FOREIGN PATENT DOCUMENTS

| | | |
|---|---|---|
| CN | 102519417 | 6/2012 |
| DE | 102012208283 | 11/2012 |
| EP | 240150 | 10/1987 |
| FR | 3004418 | 10/2014 |
| WO | WO 2008105679 | 9/2008 |

\* cited by examiner (a)

(b)

(c)

FIVE-DEGREE-OF-FREEDOM ADJUSTMENT AND POSITIONING METHOD AND APPARATUS FOR ASSEMBLY/MEASUREMENT OF ROTOR AND STATOR OF AIRCRAFT ENGINE

TECHNICAL FIELD

The present invention belongs to the technical field of aircraft engine assembly and measurement, and particularly relates to five-degree-of-freedom adjustment and positioning method and apparatus for assembly and measurement of rotor and stator of an aircraft engine.

BACKGROUND ART

In recent years, with the gradual development of the advanced equipment manufacturing industry toward the trend of precision and ultra-precision, especially the constant improvement of the performance of the aircraft engine, the precision of engine processing and assembly is required to be higher and higher. Particularly, in the pursuit of high thrust-weight ratio, the impact of factors, such as engine vibration and noise generated due to assembly errors, on the performance becomes gradually prominent, which poses severe challenge for the performance of the testing equipment of the engine, and also has higher requirement on the performance of the workbench used for adjustment and positioning. For processing and assembly of the engine, the workbench is not only required to have a function of two-dimensional adjustment in a plane, but also required to adjust the tilt angle of the workpiece and realize the function of inclination adjustment.

Engine vibration is an important factor affecting the safety of an aircraft, and is also an important indicator reflecting the engine performance. Engine turbine component, having a high rotation speed and large weight, is a major source of engine vibration. To reduce such impact, in addition to eliminating it in the testing process of dynamic balance of the engine, the assembly process should also be strictly controlled, because engine assembly is a step previous to the dynamic balancing, and vibration due to unsuitable assembly will be enlarged by 100 to 1000 times at high-speed rotation and suitable assembly can largely reduce the pressure of dynamic balance. Therefore, as a key technique for improving the performance of the aircraft engine, the aircraft engine assembly testing technique has attracted more and more attention and become a hot research topic.

An aircraft engine is composed of turbine stator and rotor which are in complex structures. The stator and rotor are required to have high concentricity themselves, and also need to be highly concentric after assembly. The high-pressure turbine rotor has a cantilever structure, so a slight imbalance and disturbance will cause a large vibration response. At present, there are many studies on the elimination of vibration of the aircraft. Many measures, such as eliminating the axial and radial deflection of the turbine stator and rotor, ensuring the concentricity of the bearing support of the turbine, and guaranteeing the consistency between the final assembly and the assembly before dynamic balancing, etc., can solve the problem of engine vibration well, and these measures can he controlled in the process of assembling the engine.

The objects of the test on the aircraft engine assembly are turbine stator and rotor. In the condition that the processing precision of the components meets the requirements, the final test is controlled by guaranteeing the assembly precision and concentricity, Rotation of the engine will generate high pressure, and the stator and rotor of the engine are composed of a plurality of single components which are stacked together. It is most desirable that the rotary axis of each component coincides with the axis of the entire engine. In operation, the large-scale engine has a high-speed rotation speed of greater than 10000 rpm, so the axial or radial deflection of the single component will inevitably result in deviation of the center of the turbine disk from the rotation axis of the engine. A very large centrifugal force will be produced under such condition, which will lead to unbalance of the rotor rotation and engine vibration, thereby ensuring the concentricity of each component is the important and difficult issue to be solved during mounting.

A British company, TAYLOR HOBSON LTD., has developed a three-point centering and leveling workbench, whose table surface is supported by three supporting points A, B, P which can form an equilateral triangle, wherein point P is fixed, and the other two points A and B are arranged with driving mechanisms and are vertically slightly movable, so as to adjust the tilt angle of the workpiece (A. B. Bamaby, M. W. Mills, H. R. Lane, Metrological apparatus workpiece position controller-automatically centres and levels by computer using surface data from transducer with transverse compensation after tilting. EP240150-A2.1987:2~8). The workbench directly bears the loads with a driving mechanism, and all the weight of the load rests on the three supporting points, which requires the driving mechanism to have great driving force. Yet, such workbench cannot be used in case of large load.

Japan Tokyo Seimitsu Company designed a worktable which could perform centering and leveling adjustments in two perpendicular directions, respectively, and provided a method of obtaining the leveling adjustment in the direction of the axis of a workpiece by using a plurality of measurement cross-sections (Katamachi, Shouzou. Roundness Measurement Apparatus. US2008015 4540. 2008:1~5).

Patent No. CN201110450087, "a large three-dimensional adjustment platform for a multifunctional measuring instrument", presented a large three-dimensional adjustment platform for a multifunctional measuring instrument; two telescoping motors distributed in the platform can push the middle platform to rotate around the rotation assembly, and drive the upper platform to rotate as well, so as to realize adjustment to the inclined deflection of the workpiece in Z direction. However, the inclination adjustment of the platform can only be performed by rotating around one rotation assembly, so the inclination adjustment is limited in ability and low in precision.

Patent No. CN98229568.5, "High precision, fast and automatic leveling mechanism", proposed a high precision and fast leveling mechanism, whose working principle is as follows: the motor drives the eccentric cam to rotate, the spring in the base causes the thimble and the eccentric cam to be pressed against each other, driving the positioning nails and calibration plate to move up and down along the bearing sleeve; the calibration plate is an air-floating thrust bearing with a number of throttling pores uniformly distributed on the end surface; a component-bearing platform is connected to the hemisphere, and when compressed air is introduced between the hemisphere and the hemisphere seat, the component-bearing platform can rotate around the spheric center of the hemisphere seat, and is driven by the rising cylinder to move up and down. When the workpiece approaches the calibration plate, a gas film is formed to make the workpiece indirectly abut with the plate and level the workpiece.

A common problem of the prior arts described above is that high precision and high displacement sensitivity of the adjustment apparatus cannot be guaranteed in case of large load. However, in the assembly of the aircraft engine, the rotatory assemblies such as leaf blades are hundreds of kilograms, and the blades are assembled directly on the workbench, which requires the adjustment workbench capable of bearing large loads and having high adjusting and positioning precision.

SUMMARY OF THE INVENTION

In view of the existing problems of the above prior arts, an object of the present invention is to provide a five-degree-of-freedom adjustment method comprising: adjusting a plane motion and a rotation of a tested piece through composite motions comprising five degrees of freedom: a 360° rotatory motion around a Z axis, a plane motion along an X axis and a plane motion along a Y axis, a rotatory motion around the X axis and a rotatory motion around the Y axis; the present invention also provides a five-degree-of-freedom adjustment and positioning apparatus for the assembly/measurement of the rotor and stator of an aircraft engine.

The above object is achieved, by the following technical solutions:

A five-degree-of-freedom adjustment and positioning method for the assembly/measurement of rotor and stator of an aircraft engine comprises: adjusting a plane motion and a rotation of a tested piece through a composite motion comprising five degrees of freedom: a 360° rotatory motion around a Z axis, a plane motion along an X axis and a plane motion along a Y axis, a rotatory motion around the X axis and a rotatory motion around the axis, wherein the X axis and the Y axis are orthogonal to each other, and the Z axis is perpendicular to the plane determined by the X and Y axes; specific processes of adjustments are as follows:

a plane motion adjustment: 1) driving a tested piece to rotate at 360° through the Z axis, measuring a radial error of a specified cross-section of the tested piece by using a sensor, and obtaining the eccentricity $\Delta x$ at the X axis and the eccentricity $\Delta y$ at the Y axis of the tested piece; 2) adjusting the tested piece to move along the X axis according to $\Delta x$, and setting the motion displacement as $\Delta x$; adjusting the tested piece to move along the Y axis according to $\Delta y$, and setting the motion displacement as $\Delta y$; 3) repeating steps 1) to 2), and stopping the plane motion adjustment till that the tested piece has an X-axis eccentricity $\Delta x$ smaller than the set value $\Delta x_0$ and a Y-axis eccentricity $\Delta y$ smaller than the set value $\Delta y_0$;

a rotation adjustment: 1) driving the tested piece to rotate at 360° through the Z axis, measuring a specified measuring cross-section 1 of the tested piece by using a sensor, to obtain the spatial coordinate $(x_1,y_1,z_1)$ of the fitting circle center of the cross-section 1; 2) driving the tested piece to rotate at 360° through the Z axis, measuring a specified measuring cross-section 2 of the tested piece by using a sensor, to obtain the spatial coordinate $(x_2,y_2,z_2)$ of the fitting circle center of the cross-section 2; 3) calculating the spatial position of the geometric axis of the tested piece from $(x_1,y_1,z_1)$ and $(x_2,y_2,z_2)$, and obtaining an angle $\theta_x$ between the projection of the geometric axis onto the plane determined by Y axis and Z axis and the Z axis and an angle $\theta_y$ between the projection of the geometric axis onto the plane determined by X axis and Z axis and the Z axis; 4) adjusting the tested piece to do a rotatory motion around the Y axis according to $\theta_x$, and setting the angle of the rotatory motion as $\theta_x$; adjusting the tested piece to do a rotatory motion around the X axis according to $\theta_y$, and setting the angle of the rotatory motion as $\theta_y$; thereby adjusting the geometric axis of the tested piece to maximally coincide with the rotatory axis Z; 5) repeating steps 1) to 4), and stopping the rotation motion adjustment till the tested piece has an angle $\theta_x$ between its projection of the geometric axis onto the plane determined by Y axis and Z axis and the Z axis smaller than the set value $\theta_{x0}$, and an angle $\theta_y$ between its projection of the geometric axis onto the plane determined by X axis and Z axis and the Z axis smaller than the set value $\theta_{y0}$.

A five-degree-of-freedom adjustment and positioning apparatus for the assembly/measurement of rotor and stator of an aircraft engine, comprises: a clamping mechanism, a turning platform component, a translational platform component, and a rotational platform component.

The turning platform component comprises a table and a base, the table being arranged on the base; an annular convex spherical bowl is arranged on the table and an annular concave spherical seat is arranged on the base; the annular concave spherical seat is fixed with a retainer; circular holes are evenly distributed on the retainer along the circumferential direction; spherical rolling elements $g_1$ having equal sphere diameters are embedded in the circular holes; the annular concave spherical seat on the base provides support for the annular convex spherical bowl on the table through spherical rolling elements $g_1$; an elastic limit supporting post and a driving system $Q_1$ are disposed on the base along the X axis, and the elastic limit supporting post closely contacts and fits with a stop block arranged on the table, so as to prevent relative rotation between the table and the base; the driving system $Q_1$ is connected with a transmission part $P_1$ arranged on the table, so as to drive the table to rotate around the Y axis; an elastic guide post and a driving system $Q_2$ are arranged along the Y axis on the base, and the elastic guide post contacts and fits with a guide block on the table, so as to guide the table to rotate around the X axis; the driving system $Q_2$ is connected with a transmission part $P_2$ on the table, so as to drive the table to rotate around the X axis.

The driving system $Q_1$ is arranged to be orthogonally adjacent to the driving system $Q_2$, and the elastic limit supporting post is arranged to be orthogonally adjacent to the elastic guide post.

The clamping mechanism is fixedly connected to the table of the turning platform component.

The translational platform component is provided below the turning platform component and drives the turning platform component to move along the X and Y axes; the translational platform component comprises a base plate and a guide layer; a weight reduction groove is provided on the guide layer along the circumferential direction, and a jacketed plate is disposed in the weight reduction groove; through holes are densely distributed in the jacketed plate; spherical rolling elements $g_2$ with equal sphere diameter are embedded in the through holes; the jacketed plate provides support for the base on the turning platform component through the spherical rolling element $g_2$; a driving system $Q_3$ for driving the guide layer to move along the Y axis is disposed symmetrically to the driving system $Q_2$ relative to the rotational axis of the rotational platform component; a driving system $Q_4$ for driving base of the turning platform component to move along the X axis is disposed symmetrically to the driving system $Q_1$ relative to the rotational axis of the rotational platform component The rotational platform component comprises an air-floating sleeve, an air-floating shaft and a rotary driving system $Q_5$, wherein the air-floating shaft is fitted in the air-floating sleeve, and an upper end of the air-floating shaft is fixedly connected with the base plate of the translational platform component and a lower end of the air-floating shaft is provided with the rotary driving system $Q_5$ for driving the rotary motion of the air-floating shaft.

The sphere diameters of the spherical rolling elements $g_1$ embedded in the circular holes are the same as or different from those of the spherical rolling elements $g_2$ embedded in the through holes.

X and Y axes are orthogonal to each other, and the rotary axis of the air-floating shaft is perpendicular to the plane determined by the X-axis and Y-axis.

The present invention has the following characteristics and beneficial effects:

1. In the present invention, the composite motion comprising five degrees of freedom is used to adjust the plane motion and rotation of the tested piece, thereby realizing the adjustment of the tested piece to any desired position in the process of assembly and measurement; meanwhile, the designed five-degree-of-freedom adjustment and positioning apparatus makes full use of the properties of spherical guidance and rolling anti-friction, as well as high accuracy of movement by gas lubrication, so it still has excellent properties of high displacement sensitivity and high stability even under large load, and thus can meet the needs of precise assembly, adjustment and measurement of the rotor and stator of the aircraft engine;

2. In the apparatus of the present invention, the turning platform component is placed on the spherical rolling elements $g_2$ of the base plate, so that the friction between the turning platform component and the base is turned into a rolling friction, and the friction force is reduced, thereby guaranteeing that the apparatus has high displacement sensitivity in case of large load, and improving the precision of apparatus adjustment;

3. The jacketed plate in the apparatus of the present invention is made of lightweight materials, reducing the resistance against the rolling of the spherical rolling elements $g_2$ in the weight reduction groove and improving the displacement sensitivity of the translational platform component along the X axis direction.

The method and apparatus of the present invention are particularly suitable for the assembly and measurement of the rotor and stator of the aircraft engine, and solve the problem of precise adjustment and positioning of the assembled/measured piece in case of large or super large load.

In the figures: A—turning platform component; B—translational platform component; C—rotational platform component; 1—clamping mechanism; 2—table; 3—base; 4—annular convex spherical bowl; 5—annular concave spherical seat; 6—retainer; 7—circular holes; 8—elastic limit supporting post; 9—driving system $Q_1$; 10—stop block; 11—transmission part $P_1$; 12—elastic guide post; 13—driving system $Q_2$; 14—guiding block; 15—transmission part $P_2$; 16—base plate; 17—guide layer; 18—weight reduction groove; 19—jacketed plate; 20—through hole; 21—driving system $Q_3$; 22—driving system $Q_4$; 23—air-floating sleeve; 24—air-floating shaft; 25—rotary driving system $Q_5$; L—geometric axis of the tested piece.

DETAILED DESCRIPTION OF THE EMBODIMENTS

Embodiments of the present invention will be described below in details in combination with the accompanying drawings.

Figure 1:
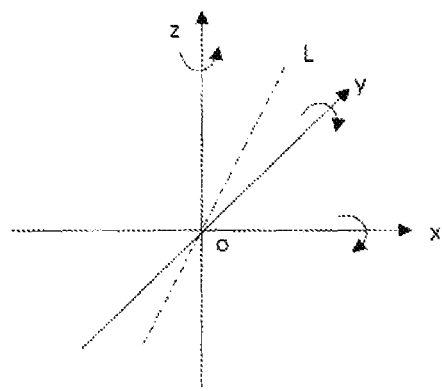
FIG. 1 is a coordinate diagram of the five-degree-of-freedom adjustment method for assembly/measurement of rotor and stator of an aircraft engine.
Figure 1:
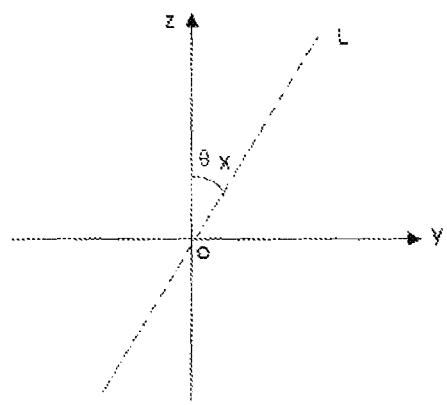
Figure 1:
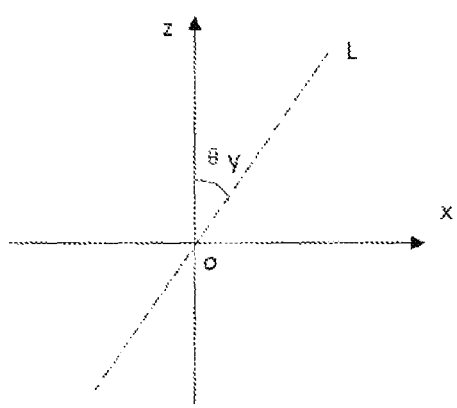
Figure 2:
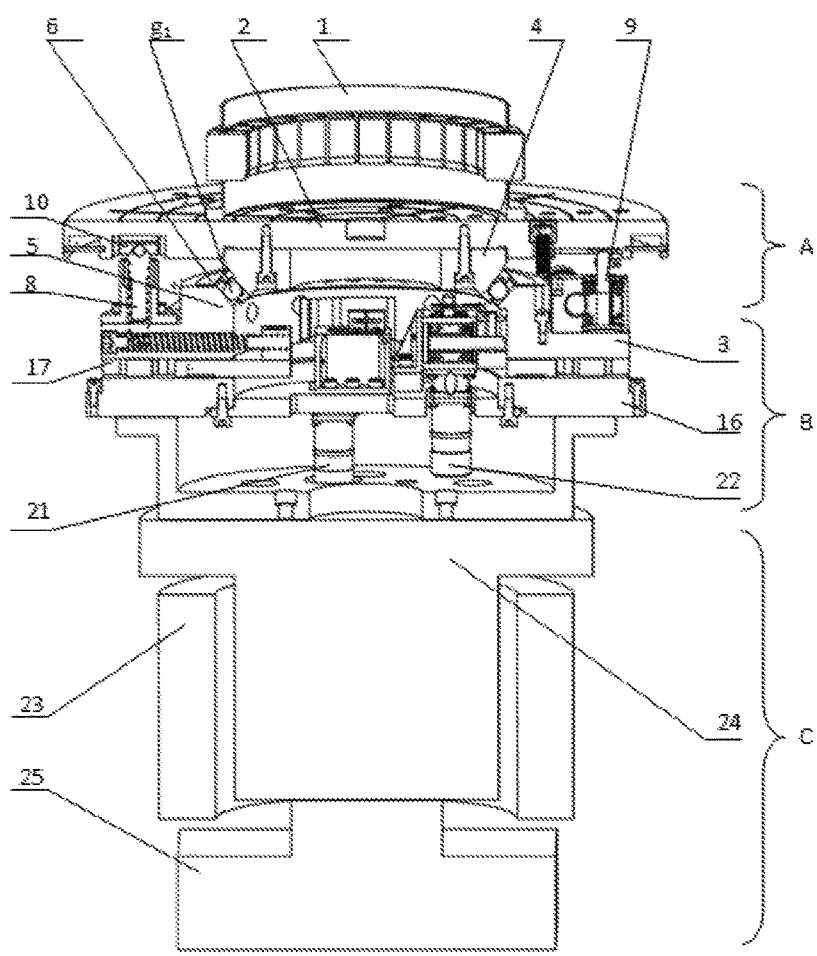
FIG. 2 is a structural schematic view of the five-degree-of-freedom adjustment and positioning apparatus for assembly/measurement of rotor and stator of an aircraft engine.
Figure 3:
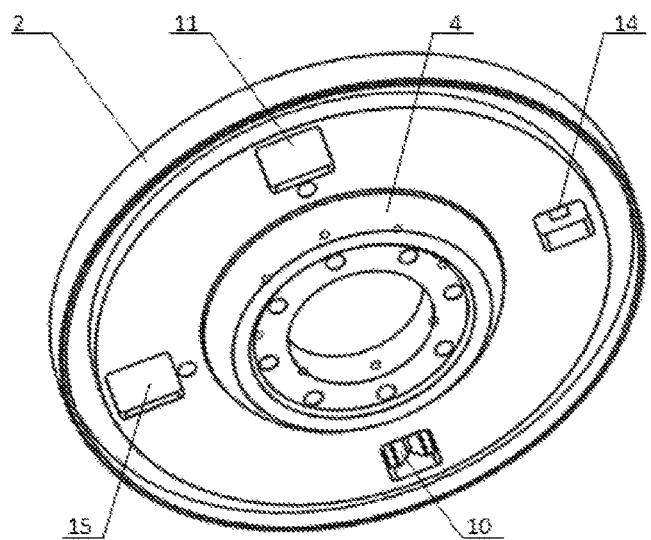
FIG. 3 is a structural schematic view of the table of the five-degree-of-freedom adjustment and positioning apparatus for assembly/measurement of rotor and stator of an aircraft engine.
Figure 4:
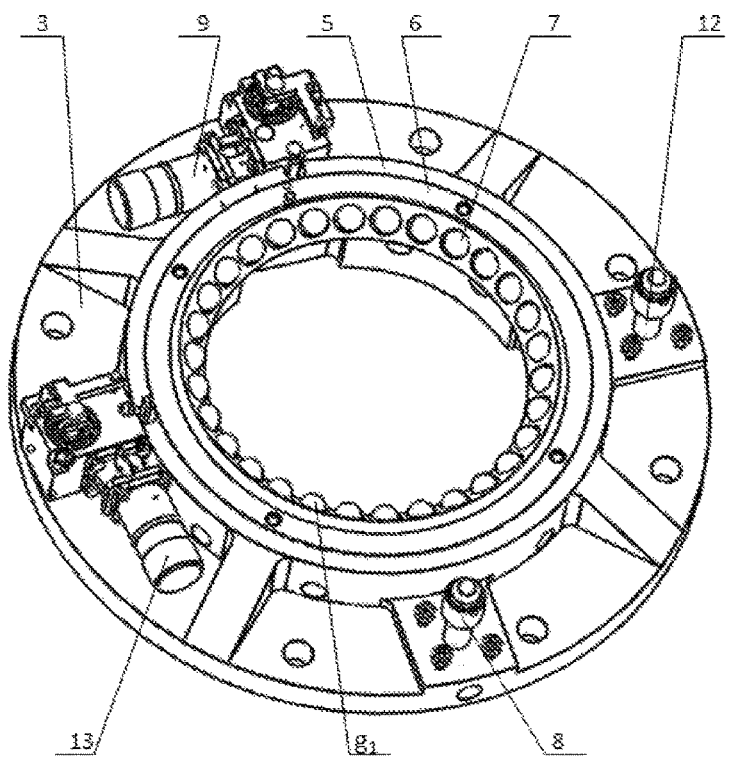
FIG. 4 is a structural schematic view of the base of the five-degree-of-freedom adjustment and positioning apparatus for assembly/measurement of rotor and stator of an aircraft engine.
Figure 5:
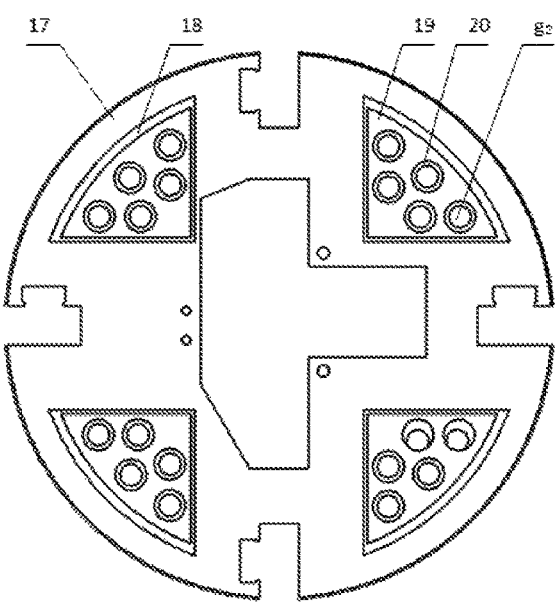
FIG. 5 is a structural schematic view of the guide layer of the five-degree-of-freedom adjustment and positioning apparatus for assembly/measurement of rotor and stator of an aircraft engine.

As shown in FIG. 2, a five-degree-of-freedom adjustment and positioning apparatus for assembly/measurement of rotor and stator of an aircraft engine comprises: a clamping mechanism 1, a turning platform component A, a translational platform component B and a rotational platform component C.

The turning platform component A comprises a table 2 and a base 3, the table 2 being arranged on the base 3; an annular convex spherical bowl 4 is provided on the table 2, and an annular concave spherical seat 5 is provided on the base 3; a retainer 6 is fixedly connected to the annular concave spherical seat 5; circular holes 7 are uniformly distributed on the retainer 6 along the circumferential direction; spherical rolling elements $g_1$ having equal sphere diameters are embedded in the circular holes 7; an annular concave spherical seat 5 on the base 3 provides support for an annular convex spherical bowl 4 on the table 2 through the spherical rolling elements $g_1$; an elastic limit supporting post 8 and a driving system $Q_1$ 9 are provided on the base 3 along the X axis; the elastic limit supporting post 8 closely contacts and fits with a stop block 10 on the table 2, so as to prevent relative rotation between the table 2 and the base 3; the driving system $Q_1$ 9 for driving table 2 to rotate around the Y axis is connected with a transmission part $P_1$ 11 which is provided on the table 2; an elastic guide post 12 and a driving system $Q_2$ 13 are provided on the base 3 along the Y axis; the elastic guide post 12 contacts and fits with a guiding block 14 provided on the table 2, so as to guide the table 2 to rotate around the X axis; and the driving system $Q_2$ 13 is connected with a transmission part $P_2$ 15 provided on the table 2, so as to drive the table 2 to rotate around the X axis.

The driving system $Q_1$ 9 is arranged to be orthogonally adjacent to the driving system $Q_2$ 13, and the elastic limit supporting post 8 is arranged to be orthogonally adjacent to the elastic guide post 12.

The clamping mechanism 1 is fixedly connected on the table 2 of the turning platform component A.

The translational platform component B is placed below the turning platform component A and drives the turning platform component A to move along the X and Y axes; the translational platform component B comprises a base plate 16 and a guide layer 17, wherein a weight reduction groove 18 is disposed on the guide layer 17 along the circumferential direction; a jacketed plate 19 is provided in the weight reduction groove 18; through holes 20 are densely distributed in the jacketed plate 19; spherical rolling elements $g_2$ having equal sphere diameter are embedded in the through holes 20; the jacketed plate 19 provides support for the base 3 of the turning platform component A through the spherical rolling elements $g_2$; a driving system $Q_3$ 21 for driving the guide layer 17 to move along the Y axis is provided symmetrically to the driving system $Q_2$ 13 relative to the rotational axis of the rotational platform component C; a driving system $Q_4$ 22 is provided symmetrically to the driving system $Q_1$ 9 relative to the rotational axis of the rotational platform component C for driving the base 3 on the turning platform component A to move along the X axis.

The rotational platform component C comprises an air-floating sleeve 23, an air-floating shaft 24 and a rotary driving system $Q_5$ 25, wherein the air-floating shaft 24 is fitted in the air-floating sleeve 23; an upper end of the air-floating shaft 24 is fixedly connected to the base plate 16 of the translational platform component B, and a lower end of the air-floating shaft 24 is provided with a rotary driving system $Q_5$ 25 for driving rotary motion of the air-floating shaft 24.

The sphere diameters of the spherical rolling elements $g_1$ embedded in the circular holes 7 are the same as or different from those of the spherical rolling elements $g_2$ embedded in the through holes 20.

The X and Y axes are orthogonal to each other, and the rotary axis of the air-floating shaft 24 is perpendicular to the plane determined by the X and Y axes.

A five-degree-of-freedom adjustment and positioning method for the assembly/measurement of rotor and stator of an aircraft engine comprises: using a rotary driving system $Q_5$ 25 to drive the air-floating shaft 24 to rotate at 360° around the Z axis in the air-floating sleeve 23, and using a driving system $Q_4$ 22 to drive the base 3 on the turning platform component A to move along the X axis, and using a driving system $Q_3$ 21 to drive the guide layer 17 to move along the Y axis, driving the loads to move along the Y axis, too. The process of plane motion adjustment is as follows: 1) driving a tested piece to rotate at 360° through the air-floating shaft 24, measuring a radial error of a specified cross-section of the tested piece by using a sensor, and obtaining the eccentricity $\Delta x$ at the X axis and the eccentricity $\Delta y$ at the Y axis of the tested piece; 2) using a driving system $Q_4$ 22 to drive the base 3 on the turning platform component A to move along the X axis according to $\Delta x$, adjusting the tested piece to move along the X axis, and setting the motion displacement as $\Delta x$; and using a driving system $Q_3$ 21 to drive the guide layer 17 to move along the Y axis according to $\Delta y$, adjusting the tested piece to move along the Y axis, and setting the motion displacement as $\Delta y$; 3) repeating steps 1) to 2), and stopping the plane motion adjustment till that the tested piece has an X-axis eccentricity $\Delta x$ smaller than the set value $\Delta x_0$ and a Y-axis eccentricity $\Delta y$ smaller than the set value $\Delta y_0$; the process of the rotation adjustment is as follows: 1) driving the tested piece to rotate at 360° through the air-floating shaft 24, and measuring a specified measuring cross-section 1 of the tested piece by using a sensor, to obtain the spatial coordinate $(x_1,y_1,z_1)$ of the fitting circle center of the cross-section 1; 2) driving the tested piece to rotate at 360° through the air-floating shaft 24, and measuring a specified measuring cross-section 2 of the tested piece by using a sensor, to obtain the spatial coordinate $(x_2,y_2,z_2)$ of the fitting circle center of the cross-section 2; 3) calculating the spatial position of the geometric axis L of the tested piece from $(x_1,y_1,z_1)$ and $(x_2,y_2,z_2)$ and obtaining an angle $\theta_x$ between the projection of the geometric axis L onto the plane determined by Y axis and Z axis and the Z axis and an angle $\theta_y$ between the projection of the geometric axis L onto the plane determined by X axis and Z axis and the Z axis; 4) adjusting the tested piece to do a rotatory motion around the Y axis according to $\theta_x$, and connecting the driving system $Q_1$ 9 with the transmission part $P_1$ 11 provided on the table 2, so as to drive the table 2 to rotate around the Y axis; setting the angle of the rotatory motion as $\theta_x$; adjusting the tested piece to do a rotatory motion around the X axis according to $\theta_y$, and utilizing the elastic guide post 12 and the driving system $Q_2$ 13 which are provided on the base 3 along the Y axis, wherein the elastic guide post 12 contacts and fits with the guide block 14 provided on the table 2, so as to guide the table 2 to rotate around the X axis, and the driving system $Q_2$ 13 is connected with the transmission part $P_2$ 15 provided on the table 2, to drive the table 2 to rotate around the X axis; setting the angle of the rotatory motion as $\theta_y$, and thereby adjusting the geometric axis L of the tested piece to maximally coincide with the rotatory axis Z; 5) repeating steps 1) to 4), and stopping the rotation motion adjustment till the tested piece has an angle $\theta_x$ between its projection of the geometric axis L onto the plane determined by Y axis and Z axis and the Z axis smaller than the set value $\theta_{x0}$, and an angle $\theta_y$ between its projection of the geometric axis L onto the plane determined by X axis and Z axis and the Z axis smaller than the set value $\theta_{y0}$.

The invention claimed is:

1. A five-degree-of-freedom adjustment and positioning method for assembly/measurement of rotor and stator of an aircraft engine, the method comprising: adjusting a plane motion and a rotation of a tested piece through a composite motion comprising five degrees of freedom: a 360° rotatory motion around a Z axis, a plane motion along an X axis, a plane motion along a Y axis, a rotatory motion around the X axis and a rotatory motion around the Y axis, wherein the X axis and the Y axis are orthogonal to each other, and the Z axis is perpendicular to a plane determined by X and Y axes, specific processes of adjustments are as follows:

a plane motion adjustment: 1) firstly driving a tested piece to rotate at 360° through the Z axis, measuring a radial error of a specified cross-section of the tested piece by using a sensor, and obtaining an eccentricity $\Delta x$ at the X axis and an eccentricity $\Delta y$ at the Y axis of the tested piece; 2) adjusting the tested piece to move along the X axis according to $\Delta x$, and setting motion displacement as $\Delta x$; adjusting the tested piece to move along the Y axis according to $\Delta y$, and setting motion displacement as $\Delta y$; 3) repeating steps 1) and 2), and stopping the plane motion adjustment until the tested piece has an X-axis eccentricity $\Delta x$ smaller than the set value $\Delta x_0$ and a Y-axis eccentricity $\Delta y$ smaller than the set value $\Delta y_0$;

a rotation adjustment: 1) driving the tested piece to rotate at 360° through the Z axis, measuring a specified measuring cross-section 1 of the tested piece by using a sensor, to obtain a spatial coordinate $(x_1,y_1,z_1)$ of a fitting circle center of the cross-section 1; 2) driving the tested piece to rotate at 360° through the Z axis, measuring a specified measuring cross-section 2 of the tested piece by using a sensor, to obtain a spatial coordinate $(x_2,y_2,z_2)$ of the fitting circle center of the cross-section 2; 3) calculating a spatial position of a geometric axis of the tested piece from $(x_1,y_1,z_1)$ and $(x_2,y_2,z_2)$, and obtaining an angle $\theta_x$ between a projection of the geometric axis onto the plane determined by Y axis and Z axis and the Z axis and an angle $\theta_y$ between the projection of the geometric axis onto the plane determined by X axis and Z axis and the Z axis; 4) adjusting the tested piece to do a rotatory motion around the Y axis according to $\theta_x$, and setting an angle of the rotatory motion as $\theta_x$; adjusting the tested piece to do a rotatory motion around the X axis according to $\theta_y$, and setting an angle of the rotatory motion as $\theta_y$, thereby adjusting the geometric axis of the tested piece to maximally coincide with the rotatory axis Z; 5) repeating steps 1) through 4), and stopping the rotation motion adjustment until the tested piece has an angle $\theta_x$ between its projection of the geometric axis onto the plane determined by Y axis and Z axis and the Z axis smaller than the set value $\theta_{x0}$, and an angle $\theta_y$ between its projection of the geometric axis onto the plane determined by X axis and Z axis and the Z axis smaller than the set value $\theta_{y0}$.

2. A five-degree-of-freedom adjustment and positioning apparatus for assembly/measurement of rotor and stator of an aircraft engine, comprising a clamping mechanism, a turning platform component, a translational platform component and a rotational platform component; and wherein:

the turning platform component comprises a table and a base, the table being disposed on the base; an annular convex spherical bowl is provided on the table, and an annular concave spherical seat is provided on the base; a retainer is fixedly connected with the annular concave spherical seat; circular holes are uniformly distributed on the retainer along a circumferential direction; spherical rolling elements having equal sphere diameters are embedded in the circular holes; the annular concave spherical seat on the base provides support for the annular convex spherical bowl on the table through the spherical rolling elements; an elastic limit supporting post and a driving system are provided on the base along the X axis; the elastic limit supporting post closely contacts and fits with a stop block provided on the table, so as to prevent relative rotation between the table and the base; the driving system for driving table to rotate around the Y axis is connected with a transmission part which is provided on the table; an elastic guide post and a driving system are provided on the base along the Y axis; the elastic guide post contacts and fits with a guiding block provided on the table, so as to guide the table to rotate around the X axis; and the driving system is connected with a transmission part provided on the table, so as to drive the table to rotate around the X axis;

the driving system is arranged to be orthogonally adjacent to the driving system, and the elastic limit supporting post is arranged to be orthogonally adjacent to the elastic guide post;

the clamping mechanism is fixedly connected on the table of the turning platform component;

the translational platform component is placed below the turning platform component and drives the turning platform component to move along the X and Y axes; the translational platform component comprises a base plate and a guide layer, wherein a weight reduction groove is disposed on the guide layer along the circumferential direction; a jacketed plate is provided in the weight reduction groove; through holes are densely distributed in the jacketed plate; spherical rolling elements having equal sphere diameters are embedded in the through holes; the jacketed plate provides support for the base (3) of the turning platform component through the spherical rolling elements; a driving system for driving the guide layer to move along the Y axis is provided symmetrically to the driving system relative to the rotational axis of the rotational platform component; a driving system is provided symmetrically to the driving system relative to the rotational axis of the rotational platform component for driving the base on the turning platform component to move along the X axis;

the rotational platform component comprises an air-floating sleeve, an air-floating shaft and a rotary driving system, wherein the air-floating shaft is fitted in the air-floating sleeve; an upper end of the air-floating shaft is fixedly connected to the base plate of the translational platform component, and a lower end of the air-floating shaft is provided with the rotary driving system for driving the rotary motion of the air-floating shaft.

3. The five-degree-of-freedom adjustment and positioning apparatus for the assembly/measurement of rotor and stator of an aircraft engine according to claim 2, wherein the sphere diameters of the spherical rolling elements embedded in the circular holes are the same as or different from those of the spherical rolling elements embedded in the through holes.

4. The five-degree-of-freedom adjustment and positioning apparatus for the assembly/measurement of rotor and stator of an aircraft engine according to claim 2, wherein the X and Y axes are orthogonal to each other, and the rotary axis of the air-floating shaft is perpendicular to the plane determined by the X and Y axes.

* * * * *

UNITED STATES PATENT AND TRADEMARK OFFICE
CERTIFICATE OF CORRECTION

PATENT NO. : 9,695,707 B2
APPLICATION NO. : 15/304238
DATED : July 4, 2017
INVENTOR(S) : Tan et al.

It is certified that error appears in the above-identified patent and that said Letters Patent is hereby corrected as shown below:

On the Title Page

Item (86) PCT No.:
Replace "PCT/CN2014/195125"
With --PCT/CN2014/095125--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*